United States Patent
Murakami

(10) Patent No.: US 9,148,750 B2
(45) Date of Patent: Sep. 29, 2015

(54) TRANSMISSION AND RECEPTION SYSTEM, TRANSMITTING AND RECEIVING UNIT, AND TRANSMITTING AND RECEIVING METHOD

(71) Applicant: NEC BIGLOBE, Ltd., Shinagawa-ku, Tokyo (JP)

(72) Inventor: Takahiro Murakami, Tokyo (JP)

(73) Assignee: BIGLOBE Inc., Tokyo (JP)

( * ) Notice: Subject to any disclaimer, the term of this patent is extended or adjusted under 35 U.S.C. 154(b) by 29 days.

(21) Appl. No.: 14/139,127

(22) Filed: Dec. 23, 2013

(65) Prior Publication Data

US 2014/0194064 A1    Jul. 10, 2014

(30) Foreign Application Priority Data

Jan. 8, 2013    (JP) .................................. 2013-001433

(51) Int. Cl.
*H04B 7/00* (2006.01)
*H04W 4/00* (2009.01)

(52) U.S. Cl.
CPC ...................................... *H04W 4/008* (2013.01)

(58) Field of Classification Search
CPC ...................................................... H04W 4/008
USPC ......................................... 455/39, 41.1, 41.2
See application file for complete search history.

(56) References Cited

U.S. PATENT DOCUMENTS

2007/0281759 A1* 12/2007 Choi ........................... 455/575.1
2011/0263202 A1* 10/2011 Lee et al. ..................... 455/41.2

FOREIGN PATENT DOCUMENTS

| JP | 2000-69149 A | 3/2000 |
| JP | 2001344352 A | 12/2001 |
| JP | 2002084575 A | 3/2002 |
| JP | 2002-335567 A | 11/2002 |
| JP | 2004159180 A | 6/2004 |
| JP | 2004-252626 A | 9/2004 |
| JP | 2008263277 A | 10/2008 |
| JP | 2009171276 A | 7/2009 |
| JP | 2010108254 A | 5/2010 |

OTHER PUBLICATIONS

Communication dated Jan. 6, 2015, issued by the Japan Patent Office in corresponding Japanese Application No. 2013-001433.
SmartWatch MN2, Watch, Apr. 13, 2012 [retrieved Dec. 24, 2014], URL, http://k-tai.impress.co.jp/docs/column/todays_goods/20120413_525433.html, 5 pages total.
SmartWatch MN2, Xperia, Apr. 10, 2012 [retrieved Dec. 24, 2014], URL, http://kunkoku.com/52007423.html, 14 pages total.

* cited by examiner

*Primary Examiner* — Tuan H Nguyen
(74) *Attorney, Agent, or Firm* — Sughrue Mion, PLLC

(57) ABSTRACT

In a transmission and reception system, a transmitting and receiving unit is configured to acquire a message, and generate candidates of a reply message to the acquired message. A wearable computer is configured to perform a short-distance communication with the transmission and reception unit to receive the candidates of the replay message transmitted from the transmission and reception unit, and transmit a desired reply message selected from among the candidates of the replay message to the transmission and reception unit.

7 Claims, 6 Drawing Sheets

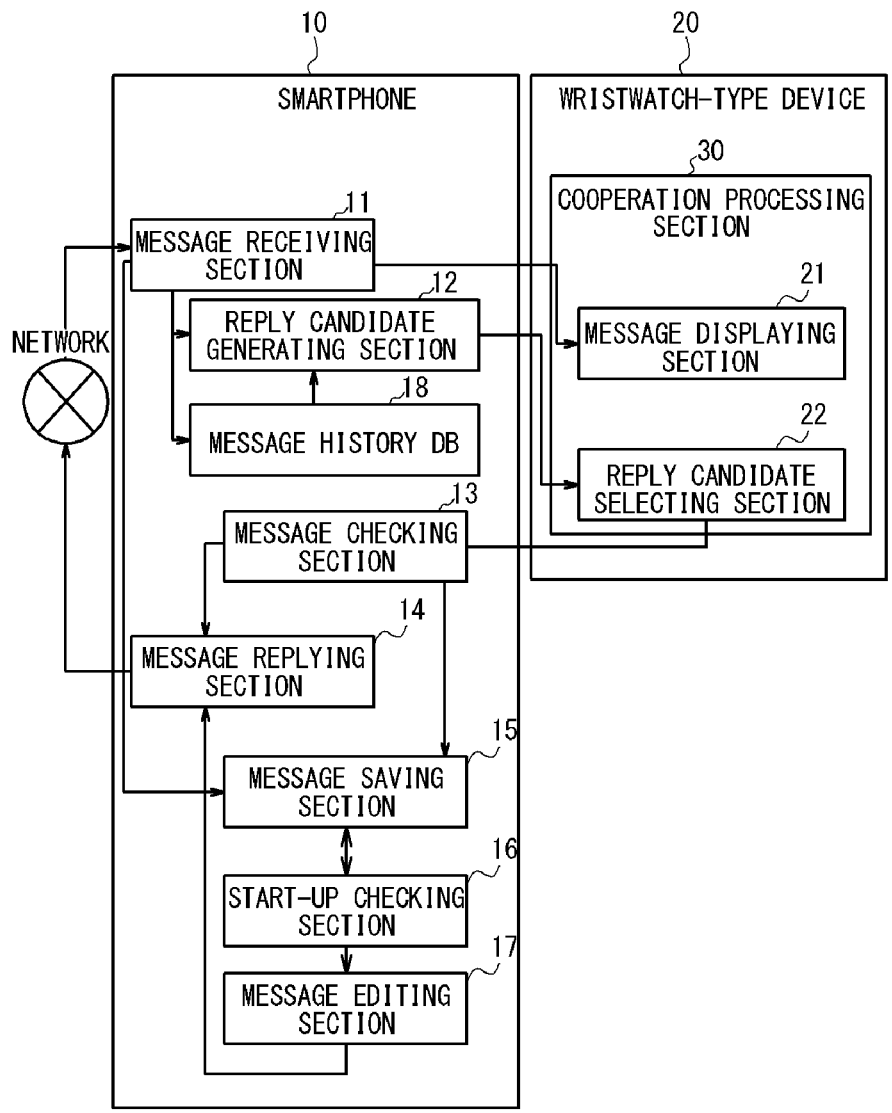

TRANSMISSION AND RECEPTION SYSTEM, TRANSMITTING AND RECEIVING UNIT, AND TRANSMITTING AND RECEIVING METHOD

CROSS-REFERENCE

This application claims a priority on convention based on Japanese Patent Application JP 2013-001433. This disclosure thereof is incorporated herein by reference.

TECHNICAL FIELD

The present invention relates to a transmission and reception system, and particularly, relates to a transmission and reception system which includes a transmitting and receiving unit for various types of messages such as e-mail messages, SMS (Short Message Service) messages, messages of a blog/microblog, and SNS (Social Networking Service) messages.

BACKGROUND ART

Smartphones, which have great processing capability and can display a large volume of data on a large screen, have come into wide use instead of existing mobile phones. As representative examples of the smartphones, "iPhone (registered trademark)" and "Android (registered trademark) terminal" are known.

Following the spread of the smartphones, "Twitter (registered trademark)" and "Facebook (registered trademark)" and so on have spread in addition to e-mails, resulting in growth in opportunities and frequency of transmitting and receiving various messages among friends and acquaintances.

On the other hand, in the field of wearable computers, devices which are worn in daily lives, like a wristwatch (a wristwatch-type device) have recently been commercialized. For example, "SmartWatch (registered trademark)" and "WIMM (registered trademark) One" are representative wristwatch-type devices. Such devices are expected to be used for transmitting and receiving of various types of messages such as e-mail messages, SMS messages, messages of a blog/microblog, and SNS messages.

The smartphones are used for transmitting and receiving of the various types of messages. However, in the smartphone, which has a large body size and requires both hands for operation, it is not easy to transmit and receive the various types of messages in a situation that one hand cannot be used due to baggage held in the hand, a situation that the smartphone cannot be taken out in such places as a crowded train and crowded facilities/shop, and a situation that use of the smartphone is difficult like during a meeting/business meal and during viewing of a film/music.

On the other hand, it is expected that the wristwatch-type device can transmit and receive such messages even in the situations that one hand cannot be used, that the smartphone cannot be taken out, and that use of the smartphone is difficult. However, the wristwatch-type device has difficulty in operation at the time of reply (response) to the various types of messages. For example, entry of characters and edition of them for the reply are difficult since a screen of a device is small.

As related art in the technical field of the present invention, Patent Literature 1 (JP 2000-069149A) discloses a communication terminal, a connection terminal connected to the communication terminal, a portable terminal for radio communication with the connection terminal, and a portable terminal system configured from these terminals. The communication terminal of the portable terminal system has the communication terminal, the connection terminal detachably connected to the communication terminal, the portable terminal which is separate from the connection terminal and is connected wirelessly to the connection terminal. The Patent Literature 1 has a data acquiring mechanism to acquire information of the communication terminal and an output mechanism to output the information acquired by the information acquiring mechanism to the connection terminal through a connector. When the data owned by the communication terminal, such as reception strength, no reception, updating of location registration, configuration information, and communication histories are outputted from the communication terminal to the connection terminal, the connection terminal wirelessly transmits the information to the mobile terminal, and the transmitted information is displayed on the mobile terminal.

Patent Literature 2 (JP 2002-335567A) discloses a mobile phone auxiliary device. The mobile phone auxiliary device is a wristwatch-type mobile phone auxiliary device, which makes it possible to instantly know incoming data like a caller number, and determine a communication type and a caller and so on, without taking out the mobile phone and seeing a display at the time of incoming to the mobile phone, when the mobile phone is kept away from a user of the mobile phone and especially when the user cannot respond on a ring tone as means of knowing incoming information.

Patent Literature 3 (JP 2004-252626A) discloses a message transmission method to an information terminal device. In the transmission method of this related art, in which various types of data such as life data and an alarm signal are detected by individual sensors and the information is transmitted to the information terminal device, so that the information terminal device notifies the incoming to a wearer with a vibrator, and a message is displayed on an LCD. A message detected in a message storing section by the individual sensors is subjected to serial transmission.

CITATION LIST

[Patent Document 1]: JP 2000-069149A
[Patent Document 2]: JP 2002-335567A
[Patent Document 3]: JP 2004-252626A

SUMMARY OF THE INVENTION

An object of the present invention is to provide a transmission and reception system in which the operability of a transmitting and receiving unit such as a smartphone can be improved by providing an auxiliary input/output unit such as a wearable computer for various types of messages.

A transmission and reception system contains a transmitting and receiving unit such as a smartphone and a wearable computer such as a watch-type device. The transmitting and receiving unit acquires a message and generates and transmits candidates of a reply message to the acquired message to the wearable computer. The wearable computer performs a short-range communication with the transmitting and receiving unit, receives the candidates of the reply message from the transmitting and receiving unit, and transmits a desired reply message selected from among the candidates of the reply message to the transmitting and receiving unit.

A transmitting and receiving unit includes a mechanism to acquire a message, a mechanism to generate candidates of a reply message to the acquired message, a mechanism to perform a short-distance communication with the wearable computer, a mechanism to transmit the candidates of the reply message to the wearable computer, a mechanism to receive a desired reply message selected from among the candidates of the reply message from the wearable computer, and a mechanism to transmit the desired reply message.

In a transmission and reception method, a transmission and reception unit acquires a message, and generates candidates of a reply message to the message. A wearable computer performs a short-distance communication with the transmitting and receiving unit, receives the candidates of the reply message transmitted from the transmitting and receiving unit, and transmits the reply message selected from among the candidates of the reply message to the transmitting and receiving unit. Also, the transmitting and receiving unit receives a desired reply message from the wearable computer and transmits the reply message.

A non-transitory computer-readable recording medium stores a computer-executable program to attain a transmission and reception method which contains: acquiring a message; generating candidates of a reply message to the acquired message; performing a short-distance communication with a wearable computer; transmitting the candidates of the reply message to the wearable computer; receiving a desired reply message selected from among the candidates of the reply message from the wearable computer; and transmitting the desired reply message.

It always becomes possible to reply to various messages such as e-mail messages, SMS (shortstop message service) messages, messages of a blog/micro-blog and SNS (social networking service) messages easily, and when the reply cannot write in the place, it becomes possible to reply necessarily later.

BRIEF DESCRIPTION OF THE DRAWINGS

FIG. 4 shows a configuration example of the smartphone and the wristwatch-type device according to a second exemplary embodiment;

DESCRIPTION OF EXEMPLARY EMBODIMENTS

Exemplary Embodiments of the present invention will be described below with reference to the attached drawings.
(Overall Configuration)

Figure 1:
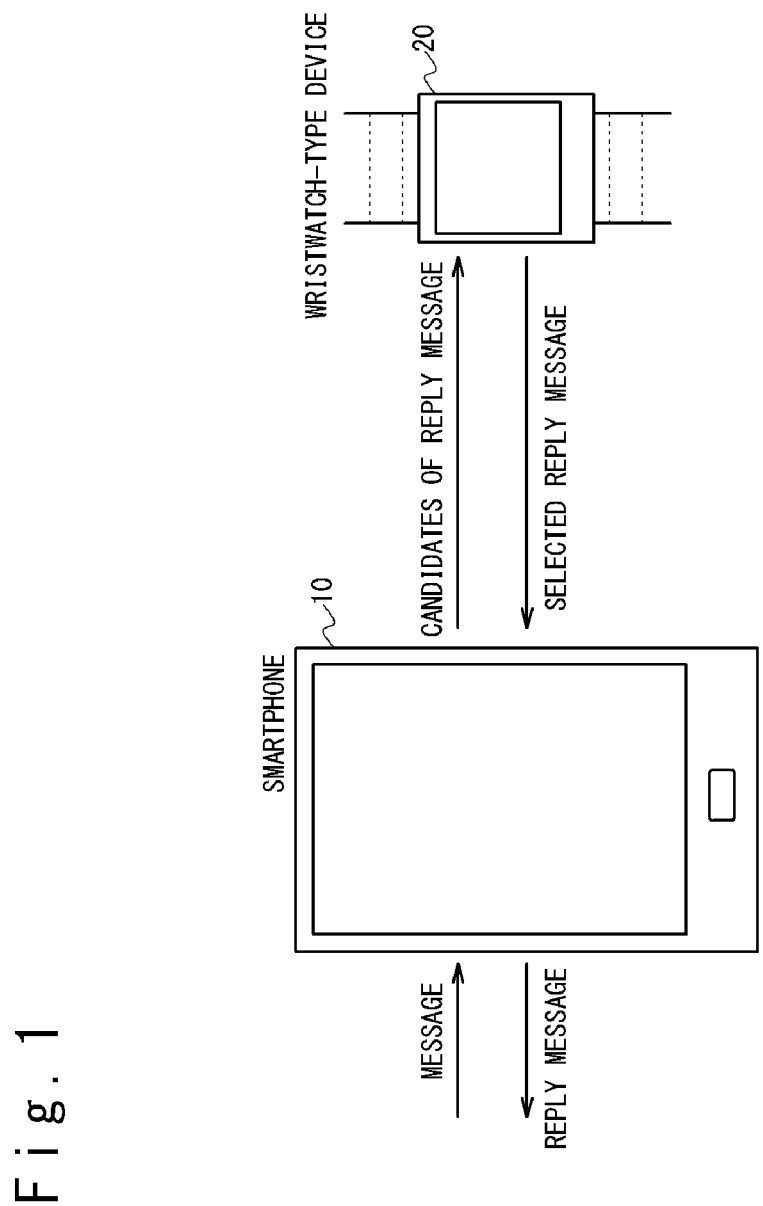
FIG. 1 shows a configuration example of a transmission and reception system according to the present invention.

As shown in FIG. 1, a transmission and reception system according to the present invention includes a smartphone 10 and a wristwatch-type device 20.

The smartphone 10 receives various types of messages such as e-mail messages, SMS (Short Message Service) messages, messages of a blog/micro-blog, and SNS (Social Networking Service) messages from an external unit, and displays the received messages on the wristwatch-type device 20. Also, the smartphone 10 generates candidates of a reply message (reply candidates) to the message received from the external unit, and displays the reply candidates on the wristwatch-type device 20. When the reply message received from the wristwatch-type device 20 is sufficient to satisfy, the reply message is transmitted to a given destination (e.g. a transmission source of the message). When the reply message received from the wristwatch-type device 20 is not sufficient to satisfy, the reply message is temporarily saved, and start-up of the smartphone 10 and restoration of the smartphone 10 from a sleep/halt state are checked. The reply message is continuously generated/edited after the start-up and the restoration, and the reply message is transmitted after the completion. Note that the smartphone 10 is just an example of a transmitting and receiving unit. For example, a smartbook and so on are also applicable.

The wristwatch-type device 20 displays options including the reply candidates received from the smartphone 10, on a user interface used for selection by a user, so that a user can select a desired reply message from the displayed options. When the desired reply message is selected by the user, the desired reply message is transmitted to the smartphone 10. Note that the wristwatch-type device 20 is just an example of a wearable computer. For example, a head mounted display and so on are also applicable.

For the communication between the smartphone 10 and the wristwatch-type device 20, the techniques of a short-distance wireless communication (e.g. near field communication) like a wireless LAN and Bluetooth (registered trademark) are used. However, practically, cable communication can also be used.

[First Exemplary Embodiment]

The first exemplary embodiment of the present invention will be described below.
(Smartphone and Wristwatch-type Device)

Figure 2:
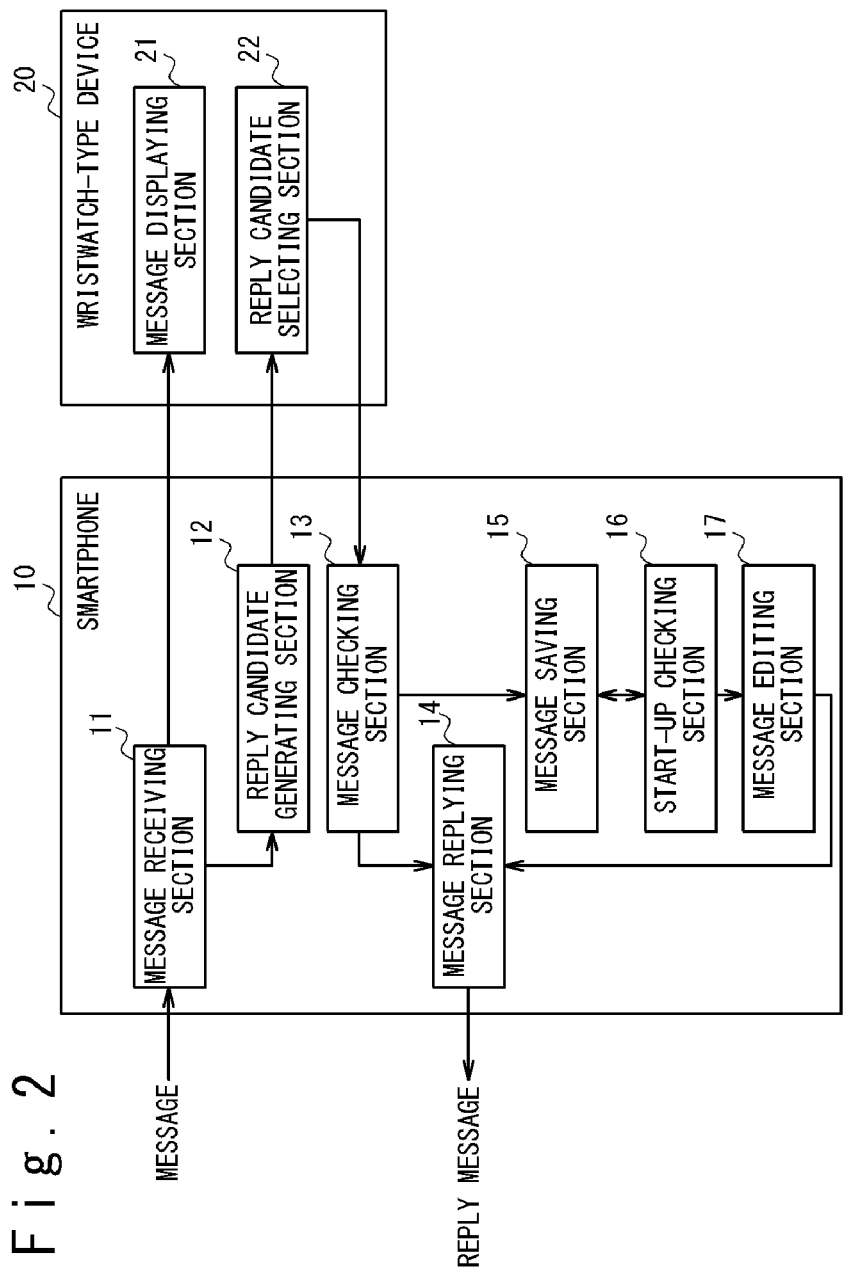
FIG. 2 shows a configuration example of a smartphone and a wristwatch-type device according to a first exemplary embodiment.

The configuration examples of the smartphone 10 and the wristwatch-type device 20 according to a first exemplary embodiment will be described in detail with reference to FIG. 2.

(Configuration of Smartphone)

The smartphone 10 has a message receiving section 11, a reply candidate generating section 12, a message checking section 13, a message replying section 14, a message saving section 15, a start-up checking section 16, and a message editing section 17.

The message receiving section 11 receives various types of messages such as e-mail messages, SMS messages, messages of a blog/micro-blog, and SNS messages, and transfers the received message to the wristwatch-type device and replay candidate generating section 12. Note that the message receiving section 11 may automatically acquire (request/receive) a new message in response to an update notice or by periodically checking when the new message is written in a specific bulletin boards, blogs and so on on the Internet.

The reply candidate generating section 12 generates reply candidates to the message received from the message receiving section 11. For example, the reply candidate generating section 12 generates the reply candidates in accordance with the received message. Note that the reply candidate generating section 12 may preliminary relate and store a given message and the reply candidates, as basic data.

The message checking section 13 checks what a user selects as the reply message from among options including the reply candidates generated by the reply candidate generating section 12. Note that the message checking section 13 may relate and store the received message and the reply candidate selected by the user. In this case, when generating the reply candidates to the received message, the reply candidate generating section 12 can preferentially generate the reply candidates related with the message.

The message replying section 14 transmits the reply message selected by the user by using e-mail or SMS. A destination is a transmission source of the message received by the message receiving section 11. Practically, however, the reply message may be forwarded to other destinations. It is also possible for the message replying section 14 to write the reply message selected by the user on specific bulletin boards and blogs on the Internet.

The message saving section 15 saves the message (reply message) to be transmitted from the smartphone 10.

The start-up checking section 16 checks start-up of the smartphone 10 and restoration of the smartphone 10 from a sleep/halt state. Note that the start-up checking section 16 can determine that the smartphone 10 should be started up and restored, when a user operation to the smartphone 10 is detected.

The message editing section 17 edits the reply message. For example, the message editing section 17 displays a user interface (UI) for the user to edit the reply message.

(Configuration of Wristwatch-type Device)

The wristwatch-type device 20 has a message displaying section 21 and a reply candidate selecting section 22.

The message displaying section 21 displays the message received from the smartphone 10.

The reply candidate selecting section 22 displays the options including the reply candidates generated by the reply candidate generating section 12 of the smartphone 10, and provides the user interface such that the user can select the reply message from the options.

(Operation)

Figure 3:
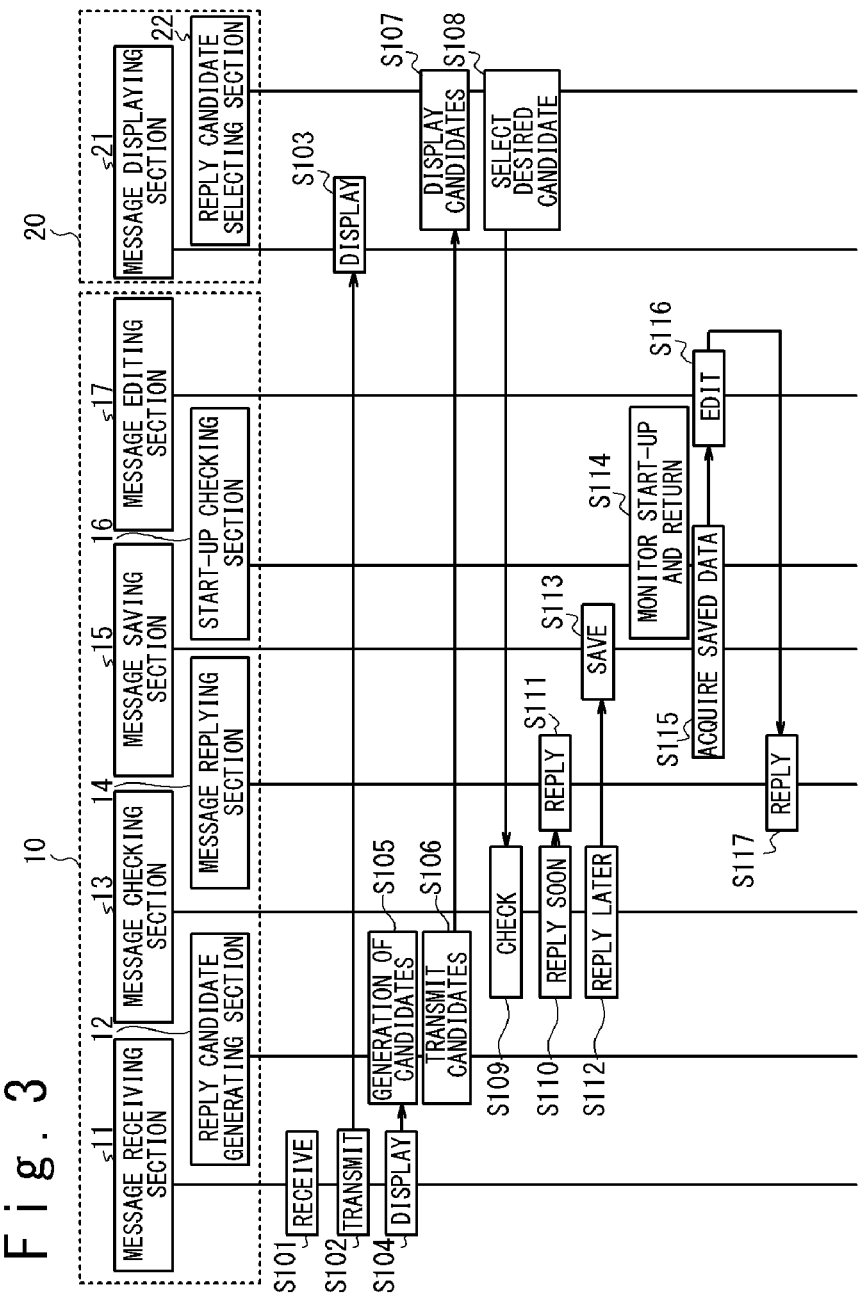
FIG. 3 is a sequence diagram showing an operation according to the first exemplary embodiment.

An operation according to the present exemplary embodiment will be described in detail with reference to FIG. 3.

(1) Step S101

The message receiving section 11 of the smartphone 10 receives various types of messages such as e-mail messages, SMS messages, messages of blog/microblog, and SNS messages arriving at the smartphone 10.

(2) Step S102

The message receiving section 11 transmits the received message to the message displaying section 21 of the wristwatch-type device 20.

(3) Step S103

The message displaying section 21 of the wristwatch-type device 20 displays the message received from the message receiving section 11 on a display.

(4) Step S104

The message receiving section 11 of the smartphone 10 transfers the received message to the reply candidate generating section 12.

(5) Step S105

The reply candidate generating section 12 generates some reply candidates (at least one reply candidate) for the reply message from the message transferred from the message receiving section 11. For example, when a message text is "Can we meet at 7 o'clock today at a usual place?", the reply candidates such as "O.K." or "Inconvenient" are generated.

(6) Step S106

The reply candidate generating section 12 transmits generated reply candidates to the reply candidate selecting section 22 of the wristwatch-type device 20.

(7) Step S107

The reply candidate selecting section 22 of the wristwatch-type device 20 receives the reply candidates from the reply candidate generating section 12 and adds additional/supplementary reply candidates to the received reply candidates to generate the options, and provides the user interface by which one of the options can be selected. For example, the additional/supplementary reply candidates such as "Reply again later" (brief reply first, and specific reply later) and "Not reply now but reply later from smartphone" in addition to the displayed reply candidates are combined to generate the options, and the user interface can be used to select one of the options. The reply candidates selecting section 22 retains the additional/supplementary reply candidates in advance (preliminary), and extracts the reply candidates which are not included in the reply candidates received from the reply candidate generating section 12 in order to combine the extracted reply candidates to the received reply candidates so as to generate the options. Practically, however, the reply candidate selecting section 22 may provide the user interface such that some reply candidates can be selected from among the options and a single reply message is generated by combining all of the selected reply candidates. The reply candidate selecting section 22 displays the user interface and the options on the display.

(8) Step S108

The user selects one of the displayed options. That is to say, the reply candidate selecting section 22 selects a desired one of the displayed options as the reply message in accordance with a selecting operation to the user interface by the user, and transmits the selected reply message to the message checking section 13 of the smartphone 10. For example, the user selects such an option as "O.K." or "Inconvenient" as the reply message, when determining that it is sufficient to reply immediately without editing. On the contrary, the user selects one of the options such as "Not reply now but reply later from smartphone" as the reply message, when determining that it is better to replay later (is not sufficient to reply immediately) because it is necessary to edit the reply message. Note that the user selects such an option as "Replay again later" as the reply message, when determining that the reply is be made without editing at present (sufficient as a provisional message) but a message should be replied again later.

(9) Step S109

The message checking section 13 of the smartphone 10 performs character analysis to check the selected reply message in order to determine whether to reply immediately or reply later.

(10) Step S110

When the reply message should be immediately transmitted, the message checking section 13 transmits the reply message to the reply message replying section 14. For example, the reply message is transmitted to the message replying section 14 when the reply message is any of "OK", "Inconvenient", and "Reply again later".

(11) Step S111

The message replying section 14 replies (transmits) the reply message received from the message checking section 13, to a transmission source of the message received by the message receiving section 11.

(12) Step S112

When the reply message should be transmitted later, the message checking section 13 saves the reply message itself or an ID (identifier) of the reply message in the message saving section 15. For example, the reply message itself or the ID of the reply message is saved in the message saving section 15 when the reply message is "Reply again later" or "Not reply now but reply later from smartphone".

(13) Step S113

The message saving section 15 saves the reply message received from the message checking section 13.

(14) Step S114

The start-up checking section 16 of the smartphone 10 monitors start-up of the smartphone 10 and restoration of the smartphone 10 from a sleep/halt state.

(15) Step S115

The start-up checking section 16 checks the message saving section 15 at the time of start-up and restoration, and when the reply message itself or the ID of the reply message is saved, transfers the reply message to the message editing section 17. Note that the start-up checking section 16 may transfer the reply message to the message editing section 17 even when a certain period of time passes away after the reply message or the ID of the reply message is saved in the message saving section 15. Practically, it is also possible that the message editing section 17 may acquire the reply message saved in the message saving section 15 in response to reception of a notice from the start-up checking section 16.

(16) Step S116

After receiving the reply message, the message editing section 17 displays a reply screen for continuously generating/editing the reply message, and transfers the reply message generated/edited based on an user operation, to the message replying section 14. The message editing section 17 may automatically generate/edit the reply message based on a presetting in response to reception of the reply message to transfer the reply message to the message replying section 14. That is to say, the message editing section 17 edits the reply message and the generated/edited reply message is replied from the message replying section 14 after the edition. Practically, the message editing section 17 may save the generated/edited message in the message saving section 15, and the message replying section 14 may acquire the generated/edited reply message saved in the message saving section 15 in response to a notification from the message editing section 17.

(17) Step S117

The message replying section 14 replies or transmits the reply message received from the message editing section 17, to the transmission source of the message received by the message receiving section 11.

In this way, it is possible to preferentially display the message of "Reply later" selected in the wristwatch-type device 20, when the user operates the smartphone 10.

[Second Exemplary Embodiment]

The second exemplary embodiment of the present invention will be described below.

(Details of Smartphone and Wristwatch-Type Device)

A configuration example of the smartphone 10 and the wristwatch-type device 20 according to a second exemplary embodiment will be described in detail with reference to FIG. 4.

(Configuration of Smartphone)

The smartphone 10 has the message receiving section 11, the reply candidate generating section 12, the message checking section 13, the message replying section 14, the message saving section 15, the start-up checking section 16, the message editing section 17, and a message history DB (database) 18.

The message receiving section 11, the reply candidate generating section 12, the message checking section 13, the message replying section 14, the message saving section 15, the start-up checking section 16, and the message editing section 17 are basically the same as those of the first exemplary embodiment. Difference in operation will be described later in detail.

The message history DB 18 accumulates past messages. For example, when a message is received, the message receiving section 11 saves the received message as a past message in the message history DB 18. The past message has a keyword, a transmitter, and a time zone as data. Practically, not only the received message but also a reply message to the received message may be accumulated. That is to say, at least one of the message receiving section 11, the reply candidate generating section 12, the message checking section 13, the message replying section 14, and the message editing section 17 may save the past message in the message history DB 18. At this time, the message history DB 18 may be common to the message saving section 15. The message history DB 18 may be also a database unit which is provided outside the smartphone 10 and may be accessed from the smartphone 10. The message history DB 18 may also be provided individually for every source/destination of each message. Additionally, the message history DB 18 may also accumulate the received message and the reply message in the form that the received message and the reply message are related to each other.

Here, the timing when the message is saved in the message history DB 18 will be described by using reception and transmission of the message as an example. The message history DB 18 is empty at first and accumulates messages as the smartphone 10 repeats the transmission and reception of the messages. The reply candidate generating section 12 generates the reply candidates to the received message because the message history DB 18 is empty at first. Thereafter, as the messages are accumulated in the message history DB 18, the reply candidate generating section 12 generates the reply candidates by referring to not only the received message but also the messages accumulated in the message history DB 18.

(Configuration of Wristwatch-type Device)

The wristwatch-type device 20 has a cooperation processing section 30.

The cooperation processing section 30 cooperates with the smartphone 10 in accordance with a cooperation program, to operate the message displaying section 21 and the reply candidate selecting section 22.

The cooperation processing section 30 has the message displaying section 21 and the reply candidate selecting section 22.

The message displaying section 21 and the reply candidate selecting section 22 are basically the same as those of the first exemplary embodiment. Difference in operation will be described later in detail.

(Operation)

Figure 5A:
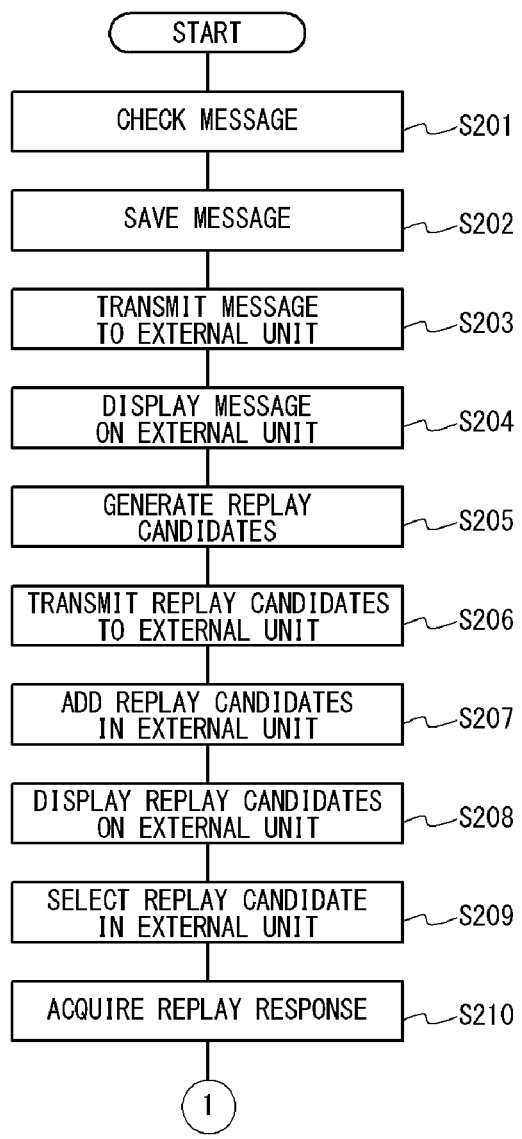
FIG. 5A is a flow chart showing a first half of operation according to the second exemplary embodiment.
Figure 5B:
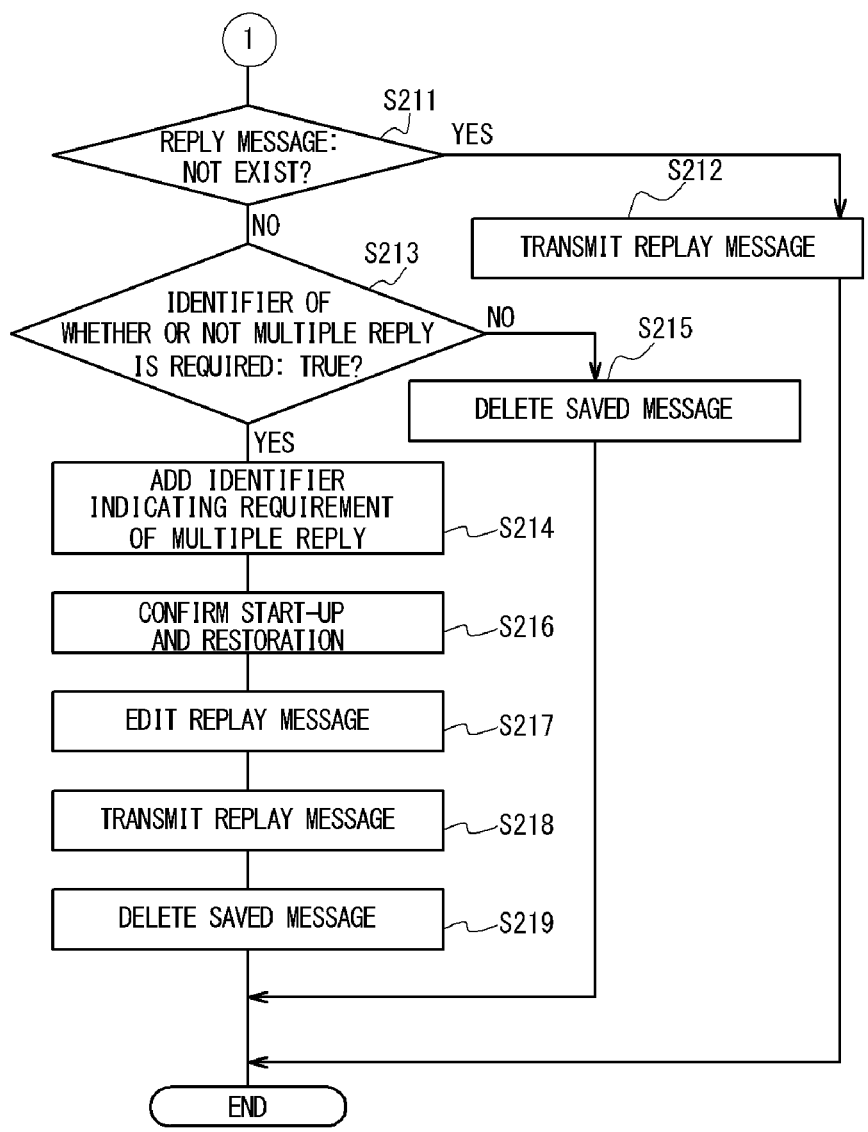
FIG. 5B is a flow chart showing the latter half of operation according to the second exemplary embodiment.

An operation according to the present exemplary embodiment will be described with reference to FIG. 5A and FIG. 5B.

(1) Step S201

The message receiving section 11 of the smartphone 10 periodically checks incoming of various types of messages such as e-mail message, SMS messages, messages of a blog/microblog, and SNS messages. At this time, incoming of a message may be recognized by using a reception function of a message notification from a server, which is one of functions of the smartphone 10. Alternatively, for a new message written in specific bulletin boards, blogs and so on on the Internet, the message receiving section 11 may checks in response to an update notice or periodically, and automatically acquire the new message, when an update has been performed.

(2) Step S202

When receiving the new message, the message receiving section 11 assigns a unique message ID to the received message and saves the received message in the message saving section 15.

(3) Step S203

The message receiving section 11 transmits the message to the cooperation processing section 30 of the wristwatch-type device 20.

(4) Step S204

The cooperation processing section 30 of the wristwatch-type device 20 transfers the message received from the smartphone 10 to the message displaying section 21. The message displaying section 21 displays the message received from the smartphone 10.

(5) Step S205

The message receiving section 11 of the smartphone 10 transfers the message to the reply candidate generating section 12. The message receiving section 11 saves and accumulates the message in the message history DB 18. The reply candidate generating section 12 analyzes the message received by the message receiving section 11 and searches the past messages accumulated in the message history DB 18 based on a keyword, a transmitter, and a time zone (as keys), to use the searched past messages as reference data, and generates a plurality of reply candidates for a reply message.

(6) Step S206

The reply candidate generating section 12 transmits the generated reply candidates to the cooperation processing section 30 of the wristwatch-type device 20 together with the message ID assigned by the message receiving section 11.

(7) Step S207

The cooperation processing section 30 adds such reply candidates as "Reply again later" and "Not reply now but reply later from smartphone" to the generated reply candidates to generate options, and transfers the options to the reply candidate selecting section 22.

(8) Step S208

The reply candidate selecting section 22 displays a user interface on the display of the wristwatch-type device 20, such that a single reply candidate can be selected from among the displayed options.

(9) Step S209

A user selects a single reply candidate from among the displayed options through operation for the user interface. That is to say, the reply candidate selecting section 22 selects a single reply candidate from among the displayed options in accordance with a user selecting operation for the user interface.

(10) Step S210

The cooperation processing section 30 transmits the reply message corresponding to the reply candidate selected by the user and associated data to the message checking section 13 of the smartphone 10. When the selected reply candidate is "Not reply now but replay later from smartphone", the reply message is empty. The associated data to be transmitted is the message ID and a re-reply necessity identifier. The re-reply necessity identifier is an identifier \indicating whether a separate reply from the smartphone 10 is necessary. For example, the re-reply necessity identifier is "TRUE" when the reply candidate, such as "Reply again later" and "Not reply now but replay later from smartphone", added by the cooperation processing section 30 is selected, and is "FALSE" when other reply candidates are selected.

(11) Step S211

The message checking section 13 checks whether the reply message transmitted from the cooperation processing section 30 of the wristwatch-type device 20 is empty.

(12) Step S212

When the reply message is not empty, the message checking section 13 transfers the reply message to the message replying section 14. The message replying section 14 replies or transmits the reply message.

(13) Step S213

The message checking section 13 checks whether the re-reply necessity identifier is "TRUE".

(14) Step S214

When the re-reply necessity identifier is "TRUE", the message checking section 13 searches messages saved in the message saving section 15 based on the message ID (as the key) transmitted from the cooperation processing section 30 of the wristwatch-type device 20, and adds a re-reply request identifier (which may be the re-reply necessity identifier) to the message.

(15) Step S215

When the re-reply necessity identifier is "FALSE", the message checking section 13 searches the messages saved in the message saving section 15 based on the message ID (as the key) transmitted from the cooperation processing section 30, and deletes the message itself from the message saving section 15.

(16) Step S216

The start-up checking section 16 of the smartphone 10 monitors the start-up of the smartphone 10 and the restoration of the smartphone 10 from the sleep/halt state. At the time of the start-up or the restoration, the start-up checking section 16 checks the message saving section 15, and transfers a message to which the re-reply request identifier is added, and the ID of the message, to the message editing section 17.

(17) Step S217

The message editing section 17 displays the message transferred from the start-up checking section 16 on the display of the smartphone 10. The user checks the message displayed on the display of the smartphone 10, and generates/edits a new reply message. That is to say, the message editing section 17 generates/edits a new reply message based on an operation by the user.

(18) Step S218

The message editing section 17 transfers the generated/edited new reply message to the message replying section 14. The message replying section 14 replies and transmits the new reply message to a reply destination.

(19) Step S219

After transmitting the new reply message, the message editing section 17 searches the messages saved in the message saving section 15 based on the message ID (as the key), and deletes the message itself from the message saving section 15.

In this way, it is possible to preferentially display the message of "Reply later" selected in the wristwatch-type device 20, when the user operates the smartphone 10.

[Third Exemplary Embodiment]

A third exemplary embodiment of the present invention will be described below.

In the above-mentioned exemplary embodiments, the smartphone 10 generates the reply candidates. Practically, however, cloud computing may be used to perform processing by cloud. That is to say, the reply candidate generating section 12 may exist not on the smartphone 10 but on the cloud.

[Fourth Exemplary Embodiment]

A fourth exemplary embodiment of the present invention will be described below.

Although the reply candidates generated by the reply candidate generating section 12 are in the form of text in the above-mentioned exemplary embodiments, the reply candidates to be generated may also be a pictogram and an illustration, for example. That is to say, the reply candidate generating section 12 may generate not only text but also a pictogram and an illustration as a reply candidate. For example, it is supposed that specific pictograms and illustrations have the meanings of "Reply immediately" and "Reply later", for example. At this time, the reply candidate selecting section 22 of the wristwatch-type device 20 may add additional/supplementary pictograms and illustrations to the received pictograms and illustrations, to generate the options. Additionally, the message checking section 13 of the smartphone 10 may check the selected pictogram or illustration, and determine whether to reply immediately or reply later.

[Fifth Exemplary Embodiment]

A fifth exemplary embodiment of the present invention will be described below.

In the above-mentioned exemplary embodiments, the message editing section 17 displays the reply message on a reply screen. Practically, however, the reply message may be displayed on a data notification area (status bar) of the smartphone 10.

[Sixth Exemplary Embodiment]

A sixth exemplary embodiment of the present invention will be described below.

A short-distance wireless communication is used for the communication between the smartphone 10 and the wristwatch-type device 20 in the above-mentioned exemplary embodiments. Practically, however, not only the short-distance wireless communication but also a long-distance wireless communication may be used. For example, when the smartphone 10 is left at home, the reply message may be generated and transmitted through the long-distance wireless communication by using the wristwatch-type device 20 which the user wears.

[Seventh Exemplary Embodiment]

The seventh exemplary embodiment of the present invention will be described below.

The reply candidate generated by the reply candidate generating section 12 is generated based only on a message, in the above-mentioned exemplary embodiments. Practically, however, the reply candidate may be changed in accordance with a transmission source and a transmission destination of the message. For example, the reply candidate generating section 12 refers to the message history DB 18 provided for every source/destination of the message, and generates reply candidates for an honorific reply message when the source always transmits the message using honorifics and when the source always transmits the reply message using honorifics.

<Relationship among the Exemplary Embodiments>

The above exemplary embodiments may be combined.

<Features of the Present Invention>

A transmitting and receiving unit has a cooperation mechanism (the message receiving section 11 and the message displaying section 21) for receiving various types of messages such as e-mail messages, SMS messages, messages of a blog/microblog, and SNS messages, and displaying the received messages on a device such as the wristwatch-type device.

The transmitting and receiving unit has a mechanism (the reply candidate generating section 12) for receiving the various types of messages, and generating a text of each of reply candidates in accordance with each of the messages.

The transmitting and receiving unit has a mechanism (the message saving section 15 and the message editing section 17) for continuously generating/editing the reply message with the smartphone in accordance with the selection of one reply candidate by the user.

<Operation and Effect>

The first effect is in that the various types of messages can be transmitted and received by the wristwatch-type device, regardless of a situation that one hand cannot be used due to baggage held in the hand, a situation that the smartphone cannot be taken out in such places as a crowded train and crowded facilities/shop, and a situation that use of the smartphone is difficult like during a meeting/business meal and during viewing of a film/music.

This is because the smartphone and the wristwatch-type device coordinate with each other to display the received message on the wristwatch-type device, and select the reply message from the options, even by using the wristwatch-type device with a small screen.

The second effect is in that it is possible to continuously generate the reply message with the smartphone when an appropriate reply message is not included in the options.

This is because a reply screen can continuously be displayed on the smartphone when the reply candidates are not appropriate.

<Examples of Hardware>

A specific example of hardware for achieving the transmission and reception system according to the present invention will be described below.

Though not shown, the smartphone 10 and the wristwatch-type device 20 as described above are each achieved by a processor which is driven based on a program and which conducts given processing, a memory which stores the program and various data, and an interface used for communication with a network.

An example of the above-mentioned processor includes a CPU (Central Processing Unit), an NP (Network Processor), a microprocessor, a microcontroller, and an LSI (Large Scale Integration) with a dedicated function.

An example of the above-mentioned memory includes such a semiconductor memory device as a RAM (Random Access Memory), a ROM (Read Only Memory), an EEPROM (Electrically Erasable and Programmable Read Only Memory), and a flash memory, such an auxiliary storage device as an HDD (Hard Disk Drive) and an SSD (Solid State Drive), such a removable disk as a DVD (Digital Versatile Disk), and such a storage medium as an SD memory card (Secure Digital memory card). A buffer and a register can also be used. A storage device using DAS (Direct Attached Storage), FC-SAN (Fibre Channel-Storage Area Network), NAS (Network Attached Storage), IP-SAN (IP-Storage Area Network) and so on, can also be used.

Note that the above processor and the above memory can be unified. For example, a single-chip microcomputer and so on are increasing in recent years. Therefore, there can be a case where a single-chip microcomputer provided in an electronic device has the above processor and memory.

An example of the above-mentioned interface includes as a substrate (a mother board, an I/O board) capable of network communication, such a semiconductor integrated circuit as a chip, such a network adapter as an NIC (Network Interface Card), and similar expansion cards, such a communication device as an antenna, and such a communication port as a connection port (connector).

An example of a network includes the Internet, a LAN (Local Area Network), a wireless LAN, a WAN (Wide Area Network), a backbone, a cable television (CATV) circuit, a fixed-line telephone network, a mobile telephone network, WiMAX (IEEE 802.16a), 3G (3rd Generation), a lease line, IrDA (Infrared Data Association), Bluetooth (registered trademark), a serial communication line, and a data bus.

Constitutional elements in the smartphone 10 and the wristwatch-type device 20 can be a module, a component, or a dedicated device, or can be a start-up (invoking) program for the constitutional elements.

Practically, however, the examples are not limited to the above.

<Additional Note>

Part of or all the above-mentioned exemplary embodiments can also be described as the following Additional Notes. Practically, however, the description is not limited to the following description examples.

[Additional Note 1]

A transmission and reception system which includes:

a transmitting and receiving unit (e.g. a smartphone) configured to acquire a message, generate reply candidates of a reply message to the acquired message, and transmit the reply message; and a wearable computer (e.g. a wristwatch-type device) configured to perform a short-distance communication with the transmitting and receiving unit, receive the reply candidates of the reply message from the transmitting and receiving unit, and transmits a desired reply message selected from among the reply candidates of the reply message to the transmitting and receiving unit.

[Additional Note 2]

The transmission and reception system according to Additional note 1, wherein the wearable computer adds additional candidates to the reply candidates of the reply message received from the transmitting and receiving unit to generate options of the reply message.

[Additional Note 3]

The transmission and reception system according to Additional Note 1 or 2, wherein the transmitting and receiving unit checks the reply message received from the wearable computer, and determines whether a reply should be made immediately or later, based on the reply message.

[Additional Note 4]

The transmission and reception system according to Additional Note 3, wherein when the reply is made later, the transmitting and receiving unit checks start-up of the transmitting and receiving unit and restoration of the transmitting and receiving unit from a sleep/halt state, and continues generation and edition of the reply message after the start-up and the restoration, and transmits the reply message after the completion of the reply message.

[Additional Note 5]

A transmitting and receiving unit having:

a mechanism to acquire a message;

a mechanism to generate candidates of a reply message to the acquired message;

a mechanism to perform a short-distance wireless communication with a wearable computer;

a mechanism to transmit the candidates of the reply message to the wearable computer;

a mechanism to receive a desired reply message selected from among the candidates for the reply message, from the wearable computer; and a mechanism to transmit the desired reply message.

<Remark>

Although the exemplary embodiments of the present invention have been described above in detail, the present invention is not limited to the above-mentioned exemplary embodiments and modification that do not depart from the scope of the present invention are included in the present invention.

What is claimed is:

1. A transmission and reception system comprising:
a transmitting and receiving unit configured to acquire a message, and generate candidates of a reply message to the acquired message; and a wearable computer configured to perform a short-distance communication with the transmission and reception unit to receive the candidates of the reply message transmitted from the transmission and reception unit, transmit a desired reply message selected from among the candidates of the reply message to the transmission and reception unit, and add additional candidates to the candidates of the reply message from the transmission and reception unit to prepare options of the reply message.

2. The transmission and reception system according to claim 1, wherein the transmission and reception unit analyzes the acquired massage and generates the candidates of the reply message, and the wearable computer adds the candidates of the reply message which replying later to the candidates of the reply message received from the transmission and reception unit to prepare options of the reply message.

3. The transmission and reception system according to claim 1, wherein the transmission and reception unit analyzes the acquired massage and generates the candidates of the reply message based on past massages accumulated in an message history memory.

4. A transmission and reception method comprising:
a transmission and reception unit acquiring a message, and generating candidates of a reply message to the acquired message;

a wearable computer performing a short-distance communication with the transmitting and receiving unit, receiving the candidates of the reply message transmitted from the transmitting and receiving unit, transmitting a desired reply message selected from among the candidates of the reply message to the transmitting and receiving unit, adding additional candidates to the candidates of the reply message received from the transmission and reception unit, and preparing options of the reply message; and the transmitting and receiving unit receiving the desired reply message from the wearable computer and transmitting the desired reply message.

5. A transmission and reception method performed by a transmission and receiving unit, comprising:
acquiring a message;
saving the acquired message;
generating candidates of a reply message to the acquired message;
performing a short-distance communication with a wearable computer;
transmitting the candidates of the reply message to the wearable computer;
receiving a desired reply message selected from among the candidates of the reply message from the wearable computer;
checking whether the reply massage received from the wearable computer is empty;
transmitting the reply message when the reply message is not empty; and
checking start-up of the transmission and reception unit and restoration of the transmission and reception unit from a sleep/halt state to display the message saved after start-up or restoration of the transmission and reception unit when the reply message is empty and a re-reply necessary identifier is necessary.

6. A non-transitory computer-readable recording medium which stores a computer-executable program to attain a transmission and reception method which comprises:
acquiring a message;
saving the acquired message;

generating candidates of a reply message to the acquired message;

performing a short-distance communication with a wearable computer;

transmitting the candidates of the reply message to the wearable computer;

receiving a desired reply message selected from among the candidates of the reply message from the wearable computer;

checking whether the reply massage received from the wearable computer is empty;

trans e reply message when the reply message is not empty; and checking start-up of the transmission and reception unit and restoration of the transmission and reception unit from a sleep/halt state to display the message saved after start-up or restoration of the transmission and reception unit when the reply message is empty and a re-reply necessary identifier is necessary.

7. A transmission and reception system comprising:

a transmitting and receiving unit configured to acquire a message, and generate candidates of a reply message to the acquired message; and a wearable computer configured to perform a short-distance communication with the transmission and reception unit to receive the candidates of the reply message transmitted from the transmission and reception unit, transmit a desired reply message selected from among the candidates of the reply message to the transmission and reception unit, and empty the reply message to transmit the reply message including a re-reply necessary identifier to the transmitting and receiving unit when the candidates of the reply message which not reply now but reply later is selected from the candidates of the reply message, and;

a transmitting and receiving unit saves the acquired massage, checks whether the reply massage is empty, transmits the reply message when the reply message is not empty, checks start-up of the transmission and reception unit and restoration of the transmission and reception unit from a sleep/halt state to display the message saved after start-up or restoration of the transmission and reception unit when the reply message is empty and the re-reply necessary identifier is necessary.

* * * * *